United States Patent
Tange et al.

(10) Patent No.: US 8,460,834 B2
(45) Date of Patent: Jun. 11, 2013

(54) HYDROGEN PRODUCTION METHOD, HYDROGEN PRODUCTION SYSTEM, AND FUEL CELL SYSTEM

(75) Inventors: Kyoichi Tange, Susono (JP); Yoshitsugu Kojima, Higashi-Hiroshima (JP); Takayuki Ichikawa, Higashi-Hiroshima (JP); Chie Oomatsu, Higashi-Hiroshima (JP); Satoshi Hino, Higashi-Hiroshima (JP); Hironobu Fujii, Higashi-Hiroshima (JP)

(73) Assignees: Toyota Jidosha Kabushiki Kaisha, Toyota-shi, Aichi-ken (JP); Hiroshima University, Higashi-Hiroshima-shi, Hiroshima-ken (JP)

( * ) Notice: Subject to any disclaimer, the term of this patent is extended or adjusted under 35 U.S.C. 154(b) by 417 days.

(21) Appl. No.: 12/680,233

(22) PCT Filed: Sep. 26, 2008

(86) PCT No.: PCT/IB2008/002507
§ 371 (c)(1), (2), (4) Date: Sep. 8, 2010

(87) PCT Pub. No.: WO2009/040646
PCT Pub. Date: Apr. 2, 2009

(65) Prior Publication Data
US 2010/0330443 A1 Dec. 30, 2010

(30) Foreign Application Priority Data
Sep. 28, 2007 (JP) .................. 2007-255558
Jun. 27, 2008 (JP) .................. 2008-168085

(51) Int. Cl.
*H01M 8/06* (2006.01)
*B01J 7/00* (2006.01)
*C01B 3/06* (2006.01)
*C01B 21/092* (2006.01)
*C01C 1/02* (2006.01)

(52) U.S. Cl.
USPC ............... 429/421; 48/61; 205/360; 422/600; 423/353; 423/413; 423/636; 423/641; 423/648.1

(58) Field of Classification Search
USPC ............. 423/648.1, 644–647, 413, 641, 636, 423/353; 48/61; 205/360; 422/600, 630; 429/421
See application file for complete search history.

(56) References Cited

U.S. PATENT DOCUMENTS 2,490,851 A * 12/1949 Alexander .................. 423/413
7,413,721 B2 * 8/2008 Kong et al. ................. 423/353

(Continued)

FOREIGN PATENT DOCUMENTS

JP 2002-526658 8/2002
JP 2005-154232 6/2005

(Continued)

OTHER PUBLICATIONS

Holleman, A. et al., "Lehrbuch der Anorganischen Chemie,"1995, ISBN: 3110126419, vol. 101, pp. 650-651.

(Continued)

*Primary Examiner* — Wayne Langel
(74) *Attorney, Agent, or Firm* — Finnegan, Henderson, Farabow, Garrett & Dunner, LLP (57) ABSTRACT

A hydrogen production method includes: a first process in which nitrogen compounds of metal and water are reacted to produce ammonia and hydroxide of the metal; a second process in which hydrogen compounds of a metal and the ammonia produced in the first process are reacted; and a third process in which hydrogen compounds of a metal and the hydroxide of the metal produced in the first process are reacted.

18 Claims, 6 Drawing Sheets

U.S. PATENT DOCUMENTS

| | | | |
|---|---|---|---|
| 7,521,036 B2* | 4/2009 | Vajo et al. | 423/644 |
| 2003/0129126 A1* | 7/2003 | Chen et al. | 423/645 |
| 2004/0265226 A1* | 12/2004 | Meisner et al. | 423/658.2 |
| 2005/0191236 A1* | 9/2005 | Pinkerton et al. | 423/658.2 |
| 2006/0127304 A1* | 6/2006 | Fujii et al. | 423/644 |
| 2006/0138996 A1* | 6/2006 | Graham et al. | 320/101 |
| 2007/0025903 A1 | 2/2007 | Kong et al. | |
| 2008/0019903 A1* | 1/2008 | Wegner | 423/657 |
| 2008/0213157 A1* | 9/2008 | McGrady et al. | 423/353 |

FOREIGN PATENT DOCUMENTS

| | | |
|---|---|---|
| JP | 2006-8439 | 1/2006 |
| JP | 2006-182598 | 7/2006 |
| WO | WO 00/20328 | 4/2000 |
| WO | WO 2007/102994 A | 9/2007 |

OTHER PUBLICATIONS

Holleman, A. et al., "Lehrbuch der Anorganischen Chemie," 1995, ISBN: 3110126419, vol. 101, p. 667.

European Office Action for EP Appl. No. 08 833 877.7 dated Mar. 17, 2011.

T. Ichikawa et al., "Hydrogen Storage Properties in Ti Catalyzed Li-N-H System," Journal of Alloys and Compounds, vol. 404-406, pp. 435-438 (2005).

L. Li et al., "Ammonia-based Hydrogen Source for Fuel Cell Applications," International Journal of Hydrogen Energy, vol. 32, pp. 6-10 (2007).

J. Lu et al., "A Hybrid Method for Hydrogen Storage and Generation from Water," Journal of Power Sources, vol. 172, pp. 853-858 (2007).

Office Action for Chinese Application No. 200880108856.3 dated Feb. 17, 2012.

Vissokov, G., "Synthesis of Nanodispersed Magnesium Nitride in Electric—Arc Plasma," Journal of the University of Chemical Technology and Metallurgy, vol. 40, No. 3, (2005), pp. 193-198.

* cited by examiner

HYDROGEN PRODUCTION METHOD, HYDROGEN PRODUCTION SYSTEM, AND FUEL CELL SYSTEM

CROSS-REFERENCE TO RELATED APPLICATIONS

This application is a national phase application of International Application No. PCT/IB2008/002507, filed Sep. 26, 2008, and claims the priority of Japanese Application Nos. 2007-255558, filed Sep. 28, 2007, and 2008-168085, filed Jun. 27, 2008, the contents of all of which are incorporated herein by reference.

BACKGROUND OF THE INVENTION

1. Field of the Invention

The invention relates to a hydrogen production method, a hydrogen production system used to implement the hydrogen production method, and a fuel cell system incorporating the hydrogen production system.

2. Description of the Related Art

In recent years, various researches and studies have been widely conducted on fuel cell systems as one of key technologies to solving the global warming issue. A fuel cell is constituted of an electrolyte layer and a pair of electrodes and causes electrochemical reactions. The electrochemical reactions at each fuel cell generate electric power, and this electric power is output. Among various fuel cell systems, household cogeneration systems and solid-polymer type fuel cell systems typically used for automobiles, etc., (will be referred to as "PEFCs") use hydrogen-containing gas and oxygen-containing gas. Therefore, in order to put such PEFCs to practical use, reliable hydrogen production technologies and hydrogen storage technologies are essential.

The hydrogen storage technologies that have been proposed so far include compressing hydrogen gas and then storing it in a high-pressure hydrogen tank, storing liquid hydrogen in a liquid hydrogen tank, and storing a hydrogen adsorption material adsorbing hydrogen (will be referred to as "hydrogen production material" where necessary) in a tank. However, in the case where a high-pressure hydrogen tank is used, a large volume of the high-pressure hydrogen tank makes it difficult to provide a compact system, and it also requires high pressurization energy to increase the pressure of hydrogen up to a desired high level, which is not efficient. In the case where a liquid hydrogen tank is used, there are some problems. For example, because it is necessary to continuously cool hydrogen such that its temperature remains at an extremely low temperature (−253° C. or lower), a large amount of energy tends to be consumed to keep hydrogen stored properly, and also it is difficult to avoid so-called "boil-off", that is, vaporization of liquid hydrogen due to the heat entering the liquid hydrogen tank from the outside. PTFCs in that a small amount of energy tends to be consumed to keep hydrogen stored properly and that is better adopted to avoid "boil-off", are watched.

Published Japanese Translation of PCT application No. 2002-526658 (JP-A-2002-526658) describes a technology related to hydrogen adsorption materials. This publication proposes a lithium group hydrogen compound having a high hydrogen capacity and capable of increasing the amount of hydrogen irreversibly at a high rate. Further, Japanese Patent Application Publication No. 2005-154232 (JP-A-2005-15422) describes a technology related to hydrogen storage materials. The hydrogen storage material described in this publication is constituted of hydrogen compounds of metal and ammonia, and hydrogen is produced through the reaction between the hydrogen compounds of metal and the ammonia. Further, Japanese Patent Application Publication No. 2006-182598 (JP-A-2006-182598) describes a technology related to hydrogen production. This publication proposes a hydrogen production system that reuses by-products by reacting them with non-separated hydrogen to produce organic hydrides.

It is considered that the use of the hydrogen storage material described in JP-A-2002-526658 makes it possible to produce a large amount of hydrogen in a small mass. However, the temperate range for the hydrogen producing reactions of this hydrogen storage material is approx. 200 to 300° C., and therefore the heat for causing the reactions needs to be supplied externally. For this reason, if this hydrogen storage material is used in a hydrogen production system, the overall power generation efficiency of said system tends to be low, which is undesirable. Meanwhile, it is considered that the use of the hydrogen storage material described in JP-A-2005-154232 makes it possible to produce a large amount of hydrogen. However, because the ammonia used for hydrogen production needs to be fully stored in the hydrogen production system in advance, a system for controlling the odor of ammonia needs to be additionally incorporated in the hydrogen production system, and therefore this hydrogen storage material is not suitable for the use in vehicles. Further, according to the technology described in JP-A-2006-182598, hydrogen production can be continued cyclically using the produced organic hydrides for the hydrogen production. However, the amount of hydrogen produced per unit mass (will be referred to as "hydrogen capacity") of organic hydrides, which are typified by decalin, etc., is relatively small, and the hydrogen producing reactions of organic hydrides occur in a temperature range of approx. 200 to 350° C., which is undesirable as in the case of JP-A-2002-526658.

In order to realize a sustainable hydrogen society, it is required to produce hydrogen from a small amount of energy, to reuse or recycle hydrogen production materials, to avoid newly producing waste upon hydrogen production and upon reusing or recycling of hydrogen production materials, and to use hydrogen production materials having a large hydrogen capacity. However, it is considered that none of the hydrogen production materials proposed so far satisfies all these requirements. That is, none of the hydrogen production materials proposed so far satisfies these general requirements and is suitable for the use in small vehicles.

SUMMARY OF THE INVENTION

The invention provides a hydrogen production method that is useful for realizing a sustainable hydrogen society, a hydrogen production system adapted to implement the hydrogen production method, and a fuel cell system incorporating the hydrogen production system.

The first aspect of the invention relates to a hydrogen production method including: a first process in which nitrogen compounds of metal and water are reacted to produce ammonia and hydroxide of the metal; a second process in which hydrogen compounds of a metal and the ammonia produced in the first process are reacted; and a third process in which hydrogen compounds of a metal and the hydroxide of the metal produced in the first process are reacted.

According to the hydrogen production method according to the first aspect of the invention, hydrogen can be produced with a small amount of energy. In the hydrogen production method of the first aspect of the invention, further, hydrogen is produced using ammonia, and the ammonia is produced in the first process. Therefore, it is not necessary to store ammonia for hydrogen production in advance. Further, as will be described later, the amide compounds of the metal that are produced together with hydrogen in the second process are reformed into hydrogen compounds of the metal, and the oxide of the metal produced in the third process is reformed into nitrogen compounds of the metal, and such reforming of the amide compounds and metal oxide does not produce waste. Further, the hydrogen production method of the first aspect of the invention provides a high hydrogen capacity and requires only liquid water, nitrogen compound of the metal in solid or liquid state, and hydrogen compounds of the metal in solid or liquid state as materials for producing hydrogen. Thus, the hydrogen production method of the first aspect of the invention enables downsizing hydrogen production systems.

The hydrogen production method of the first aspect of the invention may be such that the hydrogen compounds of the metal are hydrogen compounds of lithium or hydrogen compounds of magnesium. The hydrogen production method of the first aspect of the invention may be such that the nitrogen compounds of the metal are nitrogen compounds of lithium or nitrogen compounds of magnesium.

In this case, the amount of energy for producing hydrogen can be further reduced, and the system with the substances for producing hydrogen can be downsized more easily, and the reforming of the hydrogen compounds of the metal or the reforming of the nitrogen compound of the metal, which will be described later, can be facilitated.

Further, the hydrogen production method of the first aspect of the invention may be such that the reaction between the hydrogen compounds of the metal and the ammonia in the second process is performed in the presence of $TiCl_3$ (Titanium (III) chloride).

In this case, the reaction rate of the hydrogen producing reaction increases, and therefore the yield of hydrogen increases.

Further, the hydrogen production method of the first aspect of the invention may be such that the reaction between the hydrogen compounds of the metal and the hydroxide of the metal in the third process is performed in the presence of $TiCl_3$.

In this case, the reaction rate of the hydrogen producing reactions increases, and thus the yield of hydrogen increases, and the temperature required to ensure smooth progression of the hydrogen producing reactions decreases.

Further, the hydrogen production method of the first aspect of the invention may be such that the hydrogen compounds of the metal are produced through reaction between amide compounds of the metal produced in the second process and hydrogen.

In this case, the hydrogen compounds of the metal can be produced using the amide compounds of the metal produced in the second process, that is, the hydrogen compounds of the metal used for the hydrogen production method can be regenerated.

Further, the hydrogen production method of the first aspect of the invention may be such that the nitrogen compounds of the metal are produced through reaction between the metal obtained from the oxide of the metal produced in the third process and nitrogen.

In this case, the nitrogen compounds of the metal used in the hydrogen production method can be regenerated.

Further, the hydrogen production method of the first aspect of the invention may be such that the metal reacted with the nitrogen is obtained by reducing the oxide of the metal through molten-salt electrolysis.

In this case, the metal to be reacted with the nitrogen can be easily obtained.

A hydrogen production system that implements the hydrogen production method according to the first aspect of the invention, may have: a first tank storing the nitrogen compounds of the metal; a second tank storing the water; and a third tank and a fourth tank each storing the hydrogen compounds of the metal; separating means for separating the ammonia produced in the first process. In the hydrogen production system, the first process may be performed by delivering the water in the second tank to the first tank, the second process may be performed by delivering the ammonia separated by the separating means to the third tank after the first process, and the third process may be performed by delivering the hydroxide of the metal in the first tank to the fourth tank after the first process.

According to the hydrogen production system configured as described above, the first process can be performed by delivering the water stored in the second tank to the first tank, the second process can be performed by delivering the ammonia produced through the reaction between the nitrogen compounds of the metal and the water in the first tank to the third tank storing the hydrogen compounds of the metal, and the third process is performed by delivering the hydroxide of the metal produced in the first process (the hydroxide of the metal and the water) to the fourth tank storing the hydrogen compounds of the metal.

A hydrogen production system that implements the hydrogen production method according to the first aspect of the invention may have: a first tank storing the nitrogen compounds of the metal; a second tank storing the water; and a third tank and a fourth tank each storing the hydrogen compounds of the metal; separating means for separating the ammonia produced in the first process; a fifth tank storing the ammonia separated by the separating means; and flow-controlling means for controlling movement of fluid between the first tank and the fourth tank. In the hydrogen production system, the first process may be performed by delivering the water in the second tank to the first tank, the second process may be performed by delivering the ammonia from the fifth tank to the third tank after the first process, so that an opening is formed at the flow-controlling means due to heat generated by the second process, and the third process may be performed by delivering the hydroxide of the metal and the water in the first tank to the fourth tank through the opening after the first process.

According to the hydrogen production system configured as described above, the first process can be performed by delivering the water in the second tank to the first tank, the second process can be performed by delivering the ammonia produced through the reaction between the nitrogen compounds of the metal and the water in the first tank and separated to the fifth tank by the separating means to the third tank storing the hydrogen compounds of the metal, and the third process can be performed by delivering the hydroxide of the metal produced in the first process to the fourth tank via the opening formed due to the heat generated in the second process.

In the hydrogen production system, the metal may be lithium or magnesium.

In this case, hydrogen can be easily produced using the hydrogen production method.

In the hydrogen production system, $TiCl_3$ may be additionally stored in the third tank.

In this case, the reaction rate of the hydrogen producing reaction increases, and therefore the yield of hydrogen increases.

In the hydrogen production system, $TiCl_3$ may be additionally stored in the fourth tank.

In this case, the reaction rate of the hydrogen producing reactions increases, and thus the yield of hydrogen increases, and the temperature required to ensure smooth progression of the hydrogen producing reactions decreases.

In a fuel cell system having a fuel cell and the hydrogen production system, the hydrogen produced by the hydrogen production system may be delivered to the fuel cell, and the water produced at the fuel cell may be delivered to the second tank.

According to the fuel cell system described above, the hydrogen produced by the hydrogen production system is delivered to the fuel cell, and the fuel cell operates on the hydrogen thus delivered. Further, in this fuel cell system, because the water produced at the fuel cell is delivered to the second tank of the hydrogen fuel cell system, the water produced at and then discharged from the fuel cell can be effectively used.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
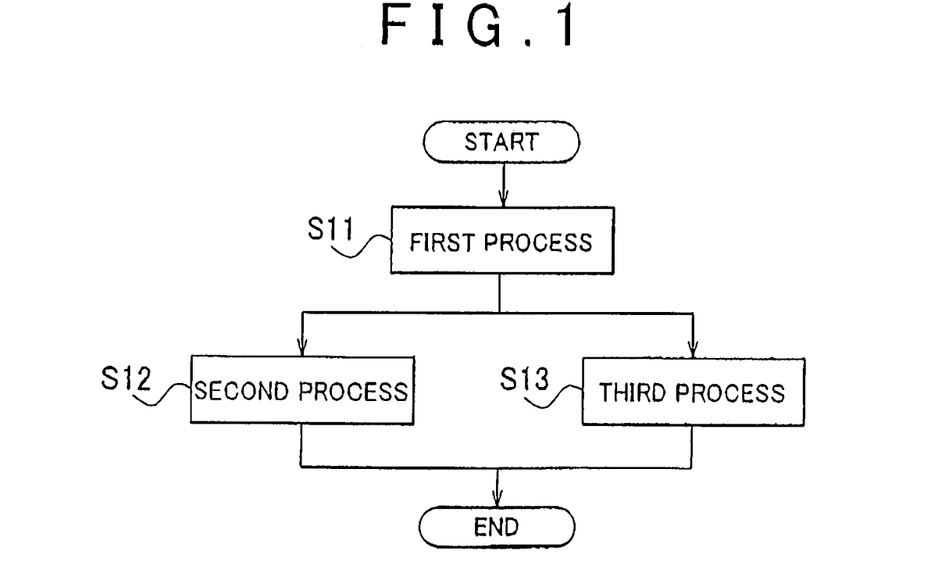
FIG. 1 is a flowchart illustrating the processes of a hydrogen production method according to the first example embodiment of the invention.

The flowchart of FIG. 1 illustrates the processes of a hydrogen production method according to the first example embodiment of the invention (this method will hereinafter be referred to as "first hydrogen production method" where necessary). Referring to FIG. 1, the first hydrogen production methods includes the first process (S11), the second process (S12), and the third process (S13). Hydrogen is produced through these processes S11 to S13.

In the first process S11, lithium nitride ($Li_3N$) is reacted with water ($H_2O$) as represented by the following reaction formula (1) indicated below.

$$Li_3N + 3H_2O \rightarrow NH_3 + 3LiOH \quad (1)$$

The reaction represented by this reaction formula (1) above is a heat-generating reaction that is caused by, for example, contacting solid lithium nitride ($Li_3N$) with liquid water ($H_2O$), and the reaction can progress at a room temperature. The ammonia ($NH_3$) produced in the first process S11 is used in the second process S12 and the lithium hydroxide (LiOH) produced in the first process S11 is used in the third process S13 as follows.

In the second process S12, the ammonia ($NH_3$) produced in the first process S11 is reacted with lithium hydride (LiH) as represented by the reaction formula (2) indicated below.

$$NH_3 + LiH \rightarrow LiNH_2 + H_2 \quad (2)$$

The reaction represented by this reaction formula (2) above is a heat-generating reaction that is caused by, for example, contacting gaseous ammonia ($NH_3$) with solid lithium hydride (LiH), and the reaction can progress at a room temperature. In the first hydrogen production method, as such, hydrogen is produced in the second process S12. The lithium amide ($LiNH_2$) produced in the second process S12 is reformed into lithium hydride (LiH) using a metal hydrogen compound production method (lithium hydride production method) according to the invention as will be described in detail later.

In the third process S13, the lithium hydroxide (LiOH) is reacted with lithium hydride (LiH) as represented by the reaction formula (3) indicated below.

$$LiOH + LiH \rightarrow Li_2O + H_2 \quad (3)$$

The reaction represented by the reaction formula (3) above is a heat-generating reaction that is caused by, for example, contacting solid lithium hydroxide (LiOH) with solid lithium hydride (LiH), and the reaction can progress at a room temperature. In the first hydrogen production method, as such, hydrogen is produced also in the third process S13. The lithium oxide ($Li_2O$) produced in the third process S13 is reformed into lithium nitride ($Li_3N$) using a metal nitrogen compound production method (lithium nitride production method) according to the invention as will be described in detail later.

Because the reaction of the third process S13 occurs between solid and solid as mentioned above, the reaction efficiency may be low as compared to the first process S11 and the second process S12. In view of this, the following methods are preferably used to improve the reaction efficiency of the third process S13: (a) Solid LiOH is reacted with solid LiH milled into particles measuring several tens nm or so in size; (b) Solid LiOH milled into particles measuring several tens nm or so in size is reacted with solid LiH milled into particles measuring several tens nm or so in size; and (c) LiOH dissolved in liquid (e.g., pure water) is reacted with solid LiH. Although the reactions in the methods (a) and (b) occur between solid and solid, because LiOH is milled into particles or LiOH and LiH are both milled into particles, the contact area between LiOH and LiH is large and therefore the reaction efficiency is high. Further, because the reaction in the method (c) occurs between dissolved LiOH and solid LiH, the reaction efficiency is high. By the method (c), the reaction efficiency can be improved especially easily.

According to the first hydrogen production method, hydrogen is produced through the heat-generating reactions represented by the reaction formulas (1) to (3) above. Thus, hydrogen can be produced without using a large amount of heat, and further each reaction progresses at a room temperature. As such, the first hydrogen production method enables producing hydrogen with a small amount of energy.

As mentioned above, Li$_3$N, H$_2$O, and LiH are used to produce hydrogen in the first hydrogen production method. Among these, Li$_3$N and LiH can be regenerated using a method described later, and H$_2$O can be obtained from the water produced at fuel cells, for example. Thus, the first hydrogen production method enables producing hydrogen from regenerated Li$_3$N and LiH and thus is useful for realizing a sustainable hydrogen society.

According to the first hydrogen production method, further, because the NH$_3$ used in the second process S12 is produced in the first process S11, it is not necessary to store NH$_3$ for producing hydrogen, that is, a necessary amount of NH$_3$ can be obtained by reacting Li$_3$N with H$_2$O. As such, the first hydrogen production method eliminates the necessity of storing NH$_3$ in advance and thus simplifies the system for preparing NH$_3$.

According to the first hydrogen production method, further, the hydrogen capacity achieved in the hydrogen productions in the second process S12 and the third process S13 is 6.6 to 11.0 mass %, which is high as compared to the hydrogen capacities achieved by the majority of the hydrogen production methods proposed so far. As such, the first hydrogen production method enables producing a large amount of hydrogen from a small amount of hydrogen production materials.

While the second process S12 and the third process S13 are performed at the same time in the example illustrated in FIG. 1, the first hydrogen production method is not limited to this feature. For example, the third process S13 may be performed after the second process S12, or the second process S12 may be performed after the third process S13. However, considering the fact that the heat generated in the second process S12 facilitates the reaction represented by the reaction formula (3), the third process S13 is preferably performed after the second process S12.

Further, although the second process S12 may be performed in any manner as long as the ammonia (NH$_3$) produced in the first process S11 can be properly reacted with lithium hydride (LiH), the ammonia (NH$_3$) produced in the first process S11 is preferably reacted with lithium hydride (LiH) in the presence of TiCl$_3$ that catalyzes the reaction represented by the reaction formula (2). In this case, the reaction rate of the reaction represented by the reaction formula (2) increases, and thus the yield of hydrogen obtained from the reaction represented by the reaction formula (2) improves. In a case where the reaction represented by the reaction formula (2) is performed in the presence of TiCl$_3$, the amount of TiCl$_3$ is not necessarily limited. For example, it is set to LiH:TiCl$_3$=1:0.05 in molar ratio.

In the first hydrogen production method, further, although the third process S13 may be performed in any manner as long as the lithium hydroxide (LiOH) produced in the first process S11 can be properly reacted with lithium hydride (LiH), preferably, the lithium hydroxide (LiOH) is reacted with lithium hydride (LiH) in the presence of TiCl$_3$ that catalyzes the reaction represented by the reaction formula (3). In this case, the reaction rate of the reaction represented by the reaction formula (3) increases, and thus the yield of hydrogen obtained from the reaction represented by the reaction formula (3) improves. Further, while the reaction represented by the reaction formula (3) needs to be performed at a high temperature of approx. 250° C. to ensure its smooth progression in the absence of TiCl$_3$, the temperature required for smooth progression of the reaction can be reduced down to approx. 180° C. in the presence of TiCl$_3$. Thus, the use of TiCl$_3$ reduces the amount of energy required to produce hydrogen. In a case where the reaction represented by the reaction formula (3) is performed in the presence of TiCl$_3$, the amount of TiCl$_3$ is not necessarily limited. For example, it is set to LiH:TiCl$_3$=1:0.05 in molar ratio.

Figure 2:
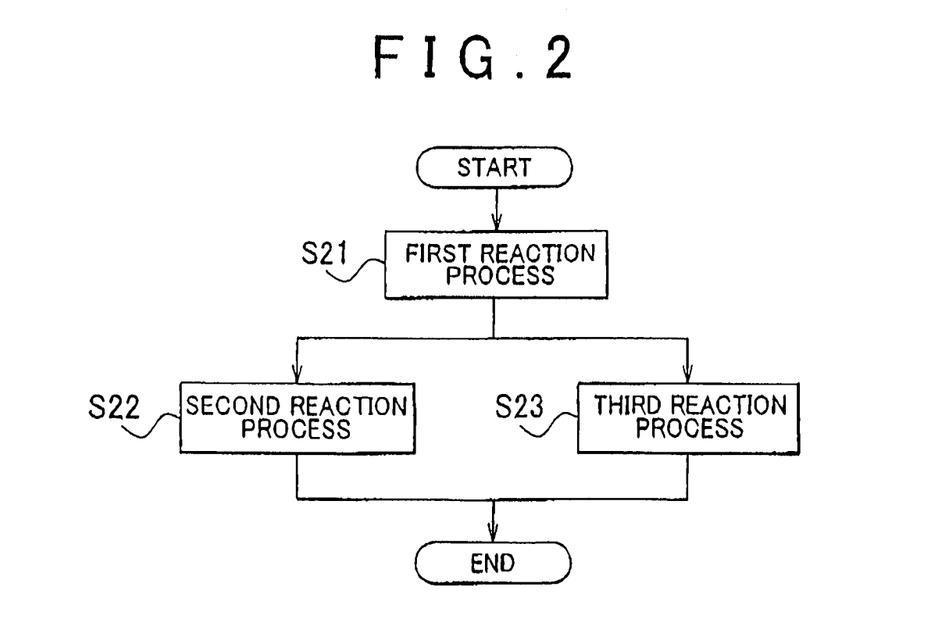
FIG. 2 is a flowchart illustrating a procedure of a hydrogen production method according to the second example embodiment of the invention.

The flowchart of FIG. 2 illustrates a procedure of a hydrogen production method according to the second example embodiment of the invention (this method will hereinafter be referred to as "second hydrogen production method" where necessary). In this example, magnesium is used to produce hydrogen. In the second hydrogen production method, the processes corresponding to the first to third processes of the first hydrogen production method will be referred to as "the first reaction process (S21)", "the second reaction process (S22)", and "the third reaction process (S23)", respectively. That is, in the second hydrogen production method, hydrogen is produced through the first reaction process S21, the second reaction process S22, and the third reaction process S23.

In the first reaction process S21, magnesium nitride (Mg$_3$N$_2$) is reacted with water (H$_2$O) as represented by the reaction formula (4) shown below.

$$Mg_3N_2 + 6H_2O \rightarrow 2NH_3 + 3Mg(OH)_2 \quad (4)$$

The reaction represented by the reaction formula (4) above is a heat-generating reaction that is caused by, for example, contacting solid magnesium nitride (Mg$_3$N$_2$) with liquid water (H$_2$O), and the reaction can progress at a room temperature. The ammonia (NH$_3$) produced in the first reaction process S21 is used in the second reaction process S22 and the magnesium hydroxide (Mg(OH)$_2$) produced in the first reaction process S21 is used in the third reaction process S23 as follows.

In the second reaction process S22, the ammonia (NH$_3$) produced in the first reaction process S21 is reacted with magnesium hydride (MgH$_2$) as represented by the reaction formula (5) indicated below.

$$2NH_3 + MgH_2 \rightarrow Mg(NH_2)_2 + 2H_2 \quad (5)$$

The reaction represented by the reaction formula (5) above is a heat-generating reaction that is caused by, for example, contacting gaseous ammonia (NH$_3$) with solid magnesium hydride (MgH$_2$), and the reaction can progress at a room temperature. According to the second hydrogen production method, thus, hydrogen is produced in the second reaction process. S22. The magnesium amide (Mg(NH$_2$)$_2$) produced in the second reaction process S22 is reformed into magnesium hydride (MgH$_2$) using a metal hydrogen compound production method (magnesium hydride production method) according to the invention as will be described in detail later.

In the third reaction process S23, the magnesium hydroxide (Mg(OH)$_2$) produced in the second reaction process S21 is reacted with magnesium hydride (MgH$_2$) as represented by the reaction formula (6) indicated below.

$$Mg(OH)_2 + MgH_2 \rightarrow 2MgO + 2H_2 \quad (6)$$

The reaction represented by the reaction formula (6) above is a heat-generating reaction that is caused by, for example, contacting solid magnesium hydroxide (Mg(OH)$_2$) with solid magnesium hydride (MgH$_2$), and the reaction can progress at a room temperature. According to the second hydrogen production method, thus, hydrogen is produced also in the third reaction process S23, and the magnesium oxide (MgO) produced in the third reaction process S23 is reformed into magnesium nitride (Mg$_3$N$_2$) using a metal nitrogen compound production method (magnesium nitride production method) according to the invention as will be described in detail later.

Because the reaction of the third reaction process S23 is caused between solid and solid as mentioned above, the reaction efficiency may be low as compared to the first reaction process S21 and the second reaction process S22. In view of this, the following methods are preferably used to improve the reaction efficiency in the third reaction process S23: (a) Solid $Mg(OH)_2$ is reacted with solid $MgH_2$ milled into particles measuring several tens nm or so in size; (b) Solid $Mg(OH)_2$ milled into particles measuring several tens nm or so in size is reacted with solid $MgH_2$ milled into particles measuring several tens nm or so in size; and (c) $Mg(OH)_2$ dissolved in liquid (e.g., pure water) is reacted with solid $MgH_2$. Although the reactions in the methods (a) and (b) occur between solid and solid, because $Mg(OH)_2$ is milled into particles or $MgH_2$ and $Mg(OH)_2$ are both milled into particles, the contact area between $MgH_2$ and $Mg(OH)_2$ is large and the reaction efficiency is high. Further, because the reaction in the method (c) occurs between dissolved $Mg(OH)_2$ and solid $MgH_2$, the reaction efficiency is high. By the method (c), the reaction efficiency can be improved especially easily.

According to the second hydrogen production method, hydrogen is produced through the heat-generating reactions represented by the reaction formulas (4) to (6) above. Thus, hydrogen can be produced without using a large amount of heat, and further each reaction progresses at a room temperature. As such, the second hydrogen production method enables producing hydrogen with a small amount of energy.

As mentioned above, $Mg_3N_2$, $H_2O$, and $MgH_2$ are used to produce hydrogen in the second hydrogen production method. Among these, $Mg_3N_2$ and $MgH_2$ can be regenerated using a method described later, and $H_2O$ can be obtained from the water produced at fuel cells, for example. Thus, the second hydrogen production method enables producing hydrogen from regenerated $Mg_3N_2$ and $MgH_2$ and thus is useful for realizing a sustainable hydrogen society.

According to the second hydrogen production method, further, because the $NH_3$ used in the second reaction process S22 is produced in the first reaction process S21, it is not necessary to store $NH_3$ for producing hydrogen, that is, a necessary amount of $NH_3$ can be obtained by reacting $Mg_3N_2$ with $H_2O$. As such, the first hydrogen production method eliminates the necessity of storing $NH_3$ in advance and thus simplifies the system for preparing $NH_3$.

According to the second hydrogen production method, further, the hydrogen capacity achieved in the hydrogen productions in the second reaction process S22 and the third reaction process S23 is 4.6 to 11.0 mass %, which is high as compared to the hydrogen capacities achieved by the majority of the hydrogen production methods proposed so far. As such, the second hydrogen production method enables producing a large amount of hydrogen from a small amount of hydrogen production materials.

While the second reaction process S22 and the third reaction process S23 are performed at the same time in the example illustrated in FIG. 2, the second hydrogen production method is not limited to this feature. For example, the third reaction process S23 may be performed after the second reaction process S22, or the second reaction process S22 may be performed after the third reaction process S23. However, considering the fact that the heat generated in the second reaction process S22 facilitates the reaction represented by the reaction formula (6), the third reaction process S23 is preferably performed after the second reaction process S22.

Further, although the second reaction process S22 may be performed in any manner as long as the ammonia ($NH_3$) produced in the first reaction process S21 can be properly reacted with magnesium hydride ($MgH_2$), the ammonia ($NH_3$) produced in the first reaction process S21 is preferably reacted with magnesium hydride ($MgH_2$) in the presence of $TiCl_3$ that catalyzes the reaction represented by the reaction formula (5). In this case, the reaction rate of the reaction represented by the reaction formula (5) increases, and thus the yield of hydrogen obtained from the reaction represented by the reaction formula (5) improves. In a case where the reaction represented by the reaction formula (5) is performed in the presence of the $TiCl_3$, the amount of $TiCl_3$ is not necessarily limited. For example, it is set to $MgH_2:TiCl_3=1:0.05$ in molar ratio.

In the second hydrogen production method, the third reaction process S23 may be performed in any manner as long as the magnesium hydroxide ($Mg(OH)_2$) produced in the first reaction process S21 can be properly reacted with magnesium hydride ($MgH_2$). Preferably, the magnesium hydroxide ($Mg(OH)_2$) produced in the first reaction process S21 is reacted with magnesium hydride ($MgH_2$) in the presence of $TiCl_3$ that catalyzes the reaction represented by the reaction formula (6). In this case, the reaction rate of the reaction represented by the reaction formula (6) increases, and thus the yield of hydrogen obtained from the reaction represented by the reaction formula (6) improves. Further, when the temperature required to ensure smooth progression of the reaction represented by the reaction formula (6) in the absence of $TiCl_3$ is T1 and the temperature required to ensure smooth progression of said reaction in the presence of $TiCl_3$ is T2, T2 is lower than T1. Thus, the use of $TiCl_3$ reduces the amount of energy required to produce hydrogen. In a case where the reaction represented by the reaction formula (6) is performed in the presence of $TiCl_3$, the amount of $TiCl_3$ is not specifically limited. For example, it is set to $MgH_2:TiCl_3=1:0.05$ in molar ratio.

Figure 3:
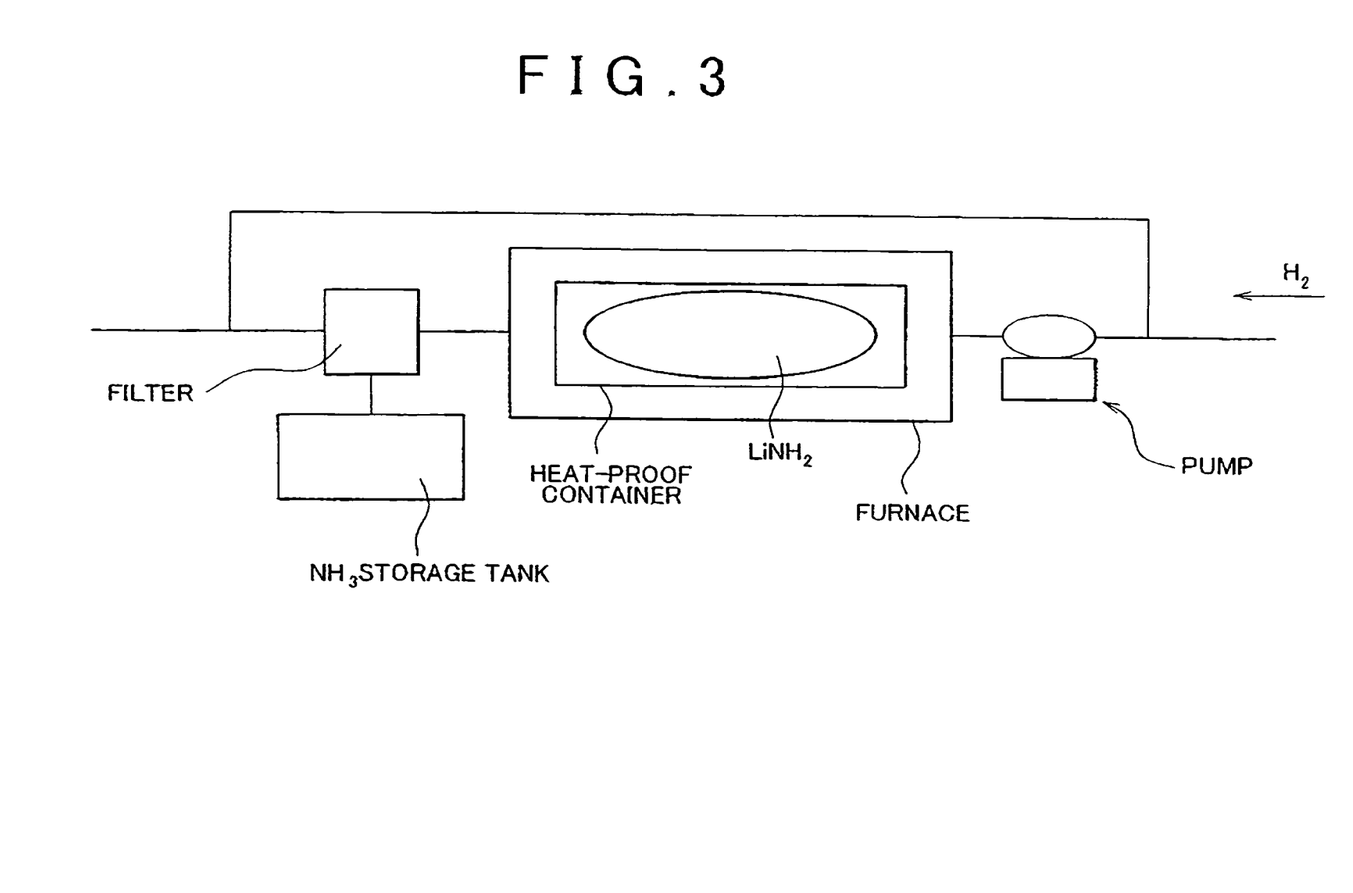
FIG. 3 is a view schematically illustrating a lithium hydride production method employed in the first example embodiment of the invention.

FIG. 3 schematically illustrates a lithium hydride production method employed in the first example embodiment of the invention. In this lithium hydride production method, the lithium amide ($LiNH_2$) produced in the second process S12 of the first hydrogen production method is reacted with hydrogen ($H_2$), whereby the reverse reaction of the reaction represented by the reaction formula (2) occurs, producing ammonia ($NH_3$) and lithium hydride (LiH). This reaction between $LiNH_2$ and $H_2$ is performed by, for example, putting a container containing $LiNH_2$ in a furnace heated up to 300° C. and then supplying hydrogen into the furnace at a pressure of 1 MPa (Refer to FIG. 3). However, because the reaction represented by the reaction formula (2) and its reverse reaction are reversible to each other, after $NH_3$ and LiH are produced by reacting $LiNH_2$ with $H_2$, the produced $NH_3$ and LiH then react with each other (i.e., the reaction represented by the reaction formula (2) occurs), whereby $LiNH_2$ and $H_2$ are produced. As a result, LiH is not produced, that is, the reverse reaction of the reaction represented by the reaction formula (2) does not occur. To cope with this, in the lithium hydride production method of the first example embodiment, preferably, the $NH_3$ produced by the reaction between $LiNH_2$ and $H_2$ is collected using a filter, and the reverse reaction of the reaction represented by the reaction formula (2) is caused in the absence of $NH_3$. The filter used for the collection of $NH_3$ is made of, for example, cooled activated carbon, or the like. In this case, liquid ammonia is collected by the activated carbon filter.

Figure 4A:
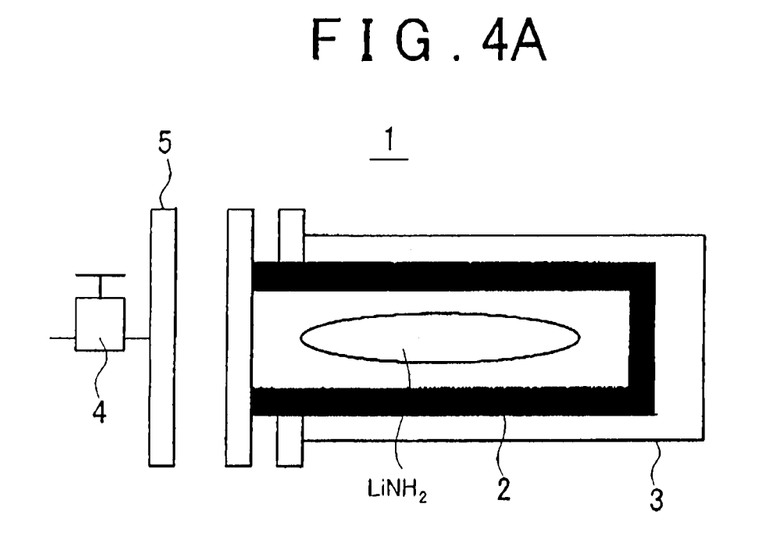
FIG. 4A and FIG. 4B are view schematically showing a container (third tank) used in the first example embodiment of the invention to contain lithium amide.
Figure 4B:
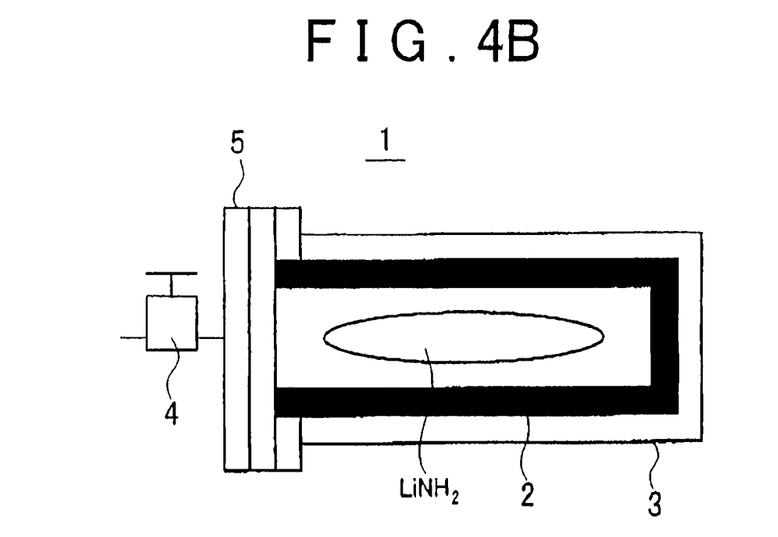

Meanwhile, if the $LiNH_2$ produced in the second process S12 contacts air, oxide films, or the like, are formed on the $LiNH_2$, and this makes it difficult to react the $LiNH_2$ with $H_2$. Therefore, in a case where LiH is regenerated using the above-described lithium hydride production method, the $LiNH_2$ produced in the second process S12 is preferably stored in a hermetically-sealed container. A container 1 shown in FIG. 4A and FIG. 4B is an example of such a container. FIG. 4A shows the opened state of the container 1, and FIG. 4B shows the closed state of the container 1. Referring to FIG. 4A and FIG. 4B, the container 1 is used to contain the $LiNH_2$ produced in the second process S12 and has an inner container 2 and an output container 3. For example, the inner container 2 is made of stainless steel, or the like, and has a thickness of 0.5 to 1 mm or so, and the outer container 3 is made of a pressure-proof aluminum alloy, or the like. As long as $H_2$ is produced in the second process S12 in a hydrogen production system incorporating the container 1 (not shown in FIG. 4A and FIG. 4B), the inner container 2 is hermetically closed by a lid 5 having a valve 4 (refer to FIG. 4B). When the pressure in the inner container 2 exceeds a predetermined value due to the $H_2$ produced, the valve 4 is opened whereby the $H_2$ is collected from the inner container 2. On the other hand, when the second process S12 ends due to running-out of LiH or $NH_3$ reacting with each other, the container 1 with the valve 4 closed is removed from the hydrogen production system incorporating the container 1 and then subjected to an LiH regeneration process. That is, the removed container 1 is put in a furnace in a regeneration process line shown in FIG. 3. The temperature of the furnace is set to approx. 300° C. Then, $H_2$ is supplied into the container 1 at a pressure of, for example, 1 MPa. At this time, the $H_2$ is delivered into the inner container 2 via the valve 4 opened. Then, in the inner container 2, the $H_2$ reacts with $LiNH_2$, whereby $NH_3$ and LiH are produced. The $NH_3$ produced in the container 1 is collected via other valve, not shown in the drawings, and thus only LiH is left in the container 1. After the LiH regeneration process is thus finished, the container 1 with the valve 4 closed is removed from the LiH regeneration line, and then it is set again in the hydrogen production system, so that the LiH in the container 1 reacts with the $NH_3$ supplied via the valve 4, whereby hydrogen is produced.

According to the lithium hydride production method described above, LiH can be regenerated by reacting the $LiNH_2$ produced in the second process S12 with $H_2$. The amount of the $H_2$ reacted with $LiNH_2$ in the above-described lithium hydride production method is very small as compared to the amount of the $H_2$ produced in the second process S12. Therefore, the use of hydrogen for the above-described lithium hydride production (regeneration) does not affect the fact that the amount of hydrogen obtainable by the first hydrogen production method is large.

Meanwhile, in the magnesium hydride production method employed in the second example embodiment, the magnesium amide ($Mg(NH_2)_2$) produced in the second reaction process S22 is reacted with hydrogen (H2), whereby the reverse reaction of the reaction represented by the reaction formula (5) occurs, producing ammonia ($NH_3$) and magnesium hydride ($MgH_2$). This reaction between $Mg(NH_2)_2$ and $H_2$ is performed by, for example, putting a heat-proof container containing $Mg(NH_2)_2$ in a furnace heated up to 250 to 350° C. and then supplying hydrogen into the furnace at a pressure of 0.5 to 2 Mpa. Because the reaction represented by the reaction formula (5) and its reverse reaction are reversible to each other, after $NH_3$ and $MgH_2$ are produced by reacting $Mg(NH_2)_2$ with $H_2$, the produced $NH_3$ and $MgH_2$ react with each other (i.e., the reaction represented by the reaction formula (5) occurs), whereby $Mg(NH_2)_2$ and $H_2$ are produced. As a result, $MgH_2$ is not produced, that is, the reverse reaction of the reaction represented by the reaction formula (5) does not occur. To cope with this, in the magnesium hydride production method of the second example embodiment, preferably, the $NH_3$ produced by the reaction between $MgH_2$ and $H_2$ is collected using a filter, and the reverse reaction represented by the reaction formula (5) is caused in the absence of $NH_3$. The filter used for the collection of $NH_3$ is made of, for example, cooled activated carbon, or the like. In this case, liquid ammonia is collected by the activated carbon filer.

Meanwhile, if the $Mg(NH_2)_2$ produced in the second reaction process S22 contacts air, oxide films, or the like, are formed on the $Mg(NH_2)_2$, and this makes it difficult to react the $Mg(NH_2)_2$ with $H_2$. Therefore, in a case where $MgH_2$ is regenerated using the above-described magnesium hydride production method, the $Mg(NH_2)_2$ produced in the second reaction process S22 is preferably stored in a hermetically-sealed container, such as the container 1 shown in FIG. 4.

According to the lithium magnesium production method described above, $MgH_2$ can be regenerated by reacting the $Mg(NH_2)_2$ produced in the second reaction process S22 with $H_2$. The amount of the $H_2$ reacted with $Mg(NH_2)_2$ in the above-described magnesium hydride production method is very small as compared to the amount of the $H_2$ produced in the second reaction process S22. Therefore, the use of hydrogen for the above-described magnesium hydride production (regeneration) does not affect the fact that the amount of hydrogen obtainable by the second hydrogen production method is large.

In the lithium nitride production method employed in the first example embodiment, the lithium nitride ($Li_3N$) regenerated by reacting nitrogen ($N_2$) with the lithium (Li) obtained from the lithium oxide ($Li_2O$) produced in the third process S13 of the first hydrogen production method is used in the first process S11. The method for obtaining Li from $Li_2O$ is not necessarily limited. For example, Li may be obtained by reducing $Li_2O$ through molten-salt electrolysis.

According to the lithium nitride production method described above, as such, $Li_3N$ can be regenerated by reacting Li obtained from $Li_2O$ produced in the third process S13 with $N_2$. As in known, the reaction between Li and $N_2$ occurs under a mild condition, and therefore the regeneration of $Li_3N$ can be performed without using a large amount of energy.

According to the first hydrogen production method, as described above, $NH_3$ and LiOH are produced by reacting $Li_3N$ with $H_2O$ in the first process S11, and the $NH_3$ produced in the first process S11 is reacted with LiH in the second process S12, whereby $H_2$ and $LiNH_2$ are produced, while the LiOH produced in the first process S11 is reacted with LiH in the third process S13, whereby $H_2$ and $Li_2O$ are produced. Meanwhile, the lithium hydride production method regenerates LiH from the $LiNH_2$ produced in the second process S12, and the lithium nitride production method regenerates $Li_3N$ from the $Li_2O$ produced in the third process S13. Therefore, according to the hydrogen production method, the lithium hydride production method, and the lithium nitride production method of the first example embodiment, hydrogen can be produced using $Li_3N$ and LiH, and LiH and $Li_3N$ can be regenerated using the $LiNH_2$ and $Li_2O$ remaining after the production of hydrogen. Therefore, according to the hydrogen production method, the lithium hydride production method, and the lithium nitride production method of the first example embodiment, hydrogen production materials can be reused, which is very desirable for realizing a sustainable hydrogen society.

In the magnesium nitride production method employed in the second example embodiment, the magnesium nitride ($Mg_3N_2$) regenerated by reacting nitrogen ($N_2$) with the magnesium (Mg) obtained from the magnesium oxide (MgO) produced in the third reaction process S23 of the second hydrogen production method is used in the first reaction process S21. The method for obtaining Mg from MgO is not necessarily limited. For example, Mg may be obtained by reducing MgO through molten-salt electrolysis.

According to the magnesium nitride production method described above, as such, $Mg_3N_2$ can be regenerated by reacting Mg obtained from MgO produced in the third reaction process S23 with $N_2$. As is known, the reaction between Mg and $N_2$ occurs in a mild condition, and therefore the regeneration of $Mg_3N_2$ can be performed without using a large amount of energy.

According the second hydrogen production method, as described above, $NH_3$ and $Mg(OH)_2$ are produced by reacting $Mg_3N_2$ with $H_2O$ in the first reaction process S21, and the $NH_3$ produced in the first reaction process S21 is reacted with $MgH_2$ in the second reaction process S22, whereby $H_2$ and $Mg(NH_2)_2$ are produced, while the $Mg(OH)_2$ produced in the first reaction process S21 is reacted with $MgH_2$ in the third reaction process S23, whereby $H_2$ and MgO are produced. Meanwhile, the magnesium hydride production method regenerates $MgH_2$ using the $Mg(NH_2)_2$ produced in the second reaction process S22, while the magnesium nitride production method regenerates $Mg_3N_2$ from the MgO produced in the third reaction process S23. Therefore, according to the hydrogen production method, the magnesium hydride production method, and the magnesium nitride production method of the second example embodiment, hydrogen can be produced using $Mg_3N_2$ and $MgH_2$, and $MgH_2$ and $Mg_3N_2$ can be regenerated using the $Mg(NH_2)_2$ and MgO remaining after the production of hydrogen. Therefore, according to the hydrogen production method, the magnesium hydride production method, and the magnesium nitride production method of the second example embodiment, hydrogen production materials can be reused, which is very desirable for realizing a sustainable hydrogen society.

Figure 5:
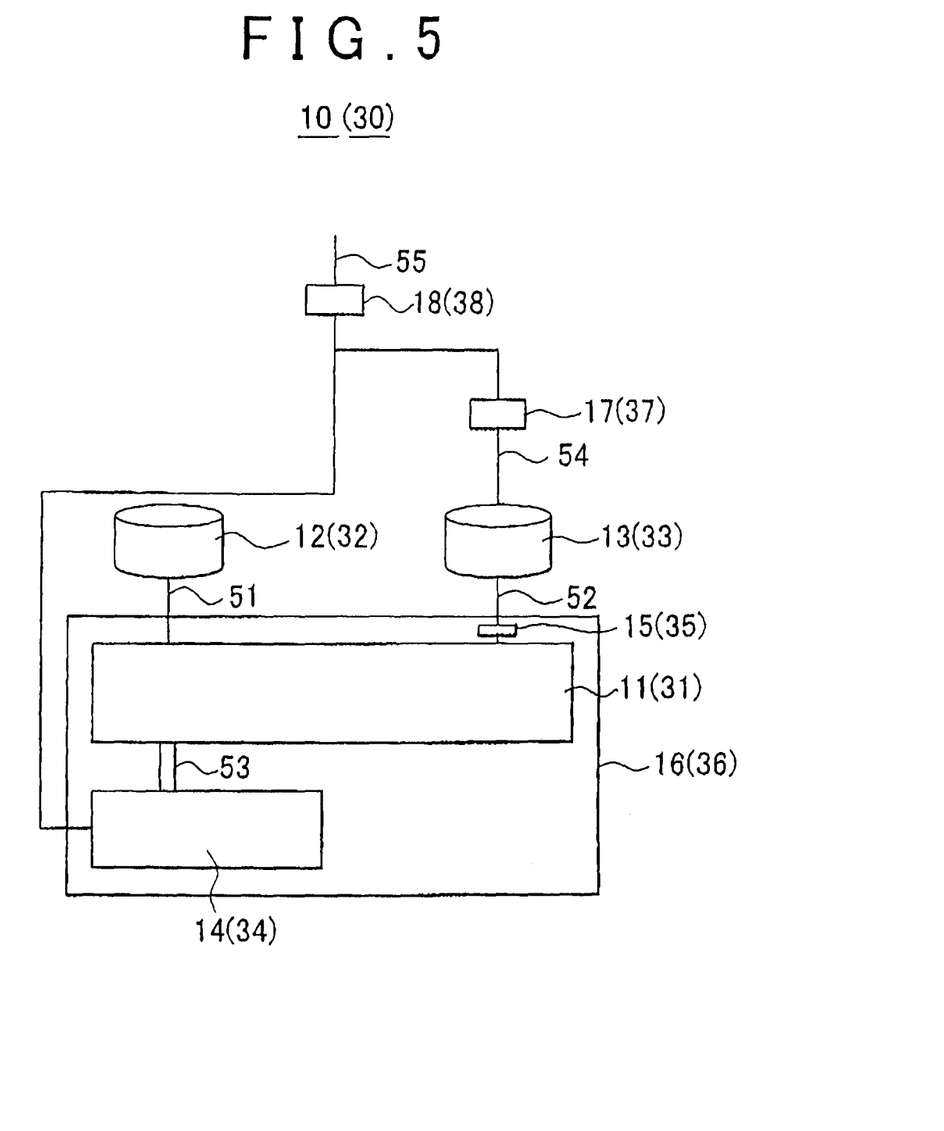
FIG. 5 is a view schematically showing a hydrogen production system according to the third example embodiment of the invention and a hydrogen production system according to the fifth example embodiment of the invention.

FIG. 5 schematically shows a hydrogen production system 10 according to the third example embodiment of the invention. The hydrogen production system 10 (will be referred to as "system 10" where necessary) implements the first hydrogen production method to produce hydrogen. The system 10 has a first tank 11 storing $Li_3N$, a second tank 12 storing water, a third tank 13 storing LiH; a fourth tank 14 storing LiH, separating means 15 for separating $NH_3$, a tank 16 containing: the first tank 11; the fourth tank 14; and separating means 15, and filters 17, 18. The first tank 11 and the second tank 12 are connected to each other via a line 51. The first tank 11, the separating means 15, and the third tank 13 are connected to each other via a line 52. The first tank 11 and the fourth tank 14 are connected to each other via a line 53. The third tank 13 and the filter 17 are connected to each other via a line 54. The fourth tank 14 and the filter 18 are connected to each other via a line 55.

When the hydrogen production system 10 produces hydrogen, water is supplied from the second tank 12 to the first tank 11, so that the reaction represented by the reaction formula (1) occurs between the supplied water and the $Li_3N$ stored in the first tank 11 (the first process S11), whereby LiOH and $NH_3$ are produced. The $NH_3$ produced in the first tank 11 is separated by the separating means 15 located at a position higher than the first tank 11 in the direction of gravity and made of activated carbon, or the like. The $NH_3$ separated by the separating means 15 is delivered to the third tank 13 via the line 52. Because LiH is stored in the third tank 13 to which the $NH_3$ has been delivered, the reaction represented by the reaction formula (2) occurs between the LiH stored in the third tank 13 and the $NH_3$ delivered thereto (the second process S12), whereby $LiNH_2$ and $H_2$ are produced. The $H_2$ produced in the third tank 13 is delivered to the filter 18 via the line 54, whereby impurities are removed. On the other hand, the $LiNH_2$ produced in the third tank 13 is kept in the third tank 13 and, for example, it is reformed into LiH using the lithium hydride production method described above.

Meanwhile, the LiOH produced in the first tank 11 is delivered separately, or together with the water supplied to the first tank 11, to the fourth tank 14 via the line 53. The fourth tank 14 is located at a position lower than the first tank 11 in the direction of gravity. Because LiH is stored in the fourth tank 14 to which the LiOH has been delivered, the reaction represented by the reaction formula (3) occurs between the LiH stored in the fourth tank 14 and the LiOH delivered (the third process S13), whereby $Li_2O$ and $H_2$ are produced. The $H_2$ produced in the fourth tank 14 is delivered to the filter 18 via the line 55, whereby impurities are removed. On the other hand, the $Li_2O$ produced in the fourth tank 14 is kept in the fourth tank 14. For example, it is reformed into $Li_3N$ using the lithium nitride production method described above.

As such, as the hydrogen production system 10 implements the first hydrogen production method, hydrogen is produced through the first process S11, the second process S12, and the third process S13.

Figure 6:
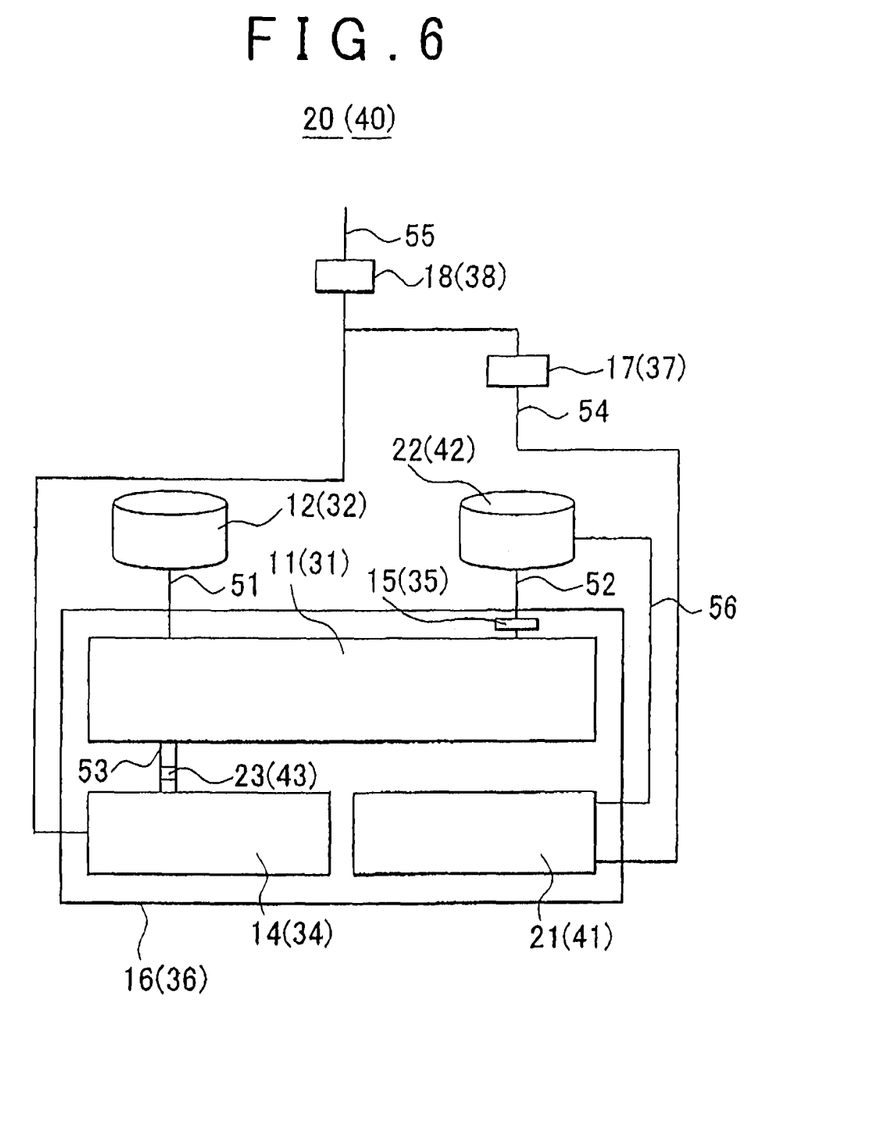
FIG. 6 is a view schematically showing a hydrogen production system according to the fourth example embodiment of the invention and a hydrogen production system according to the sixth example embodiment of the invention.

FIG. 6 schematically shows a hydrogen production system 20 according to the fourth example embodiment of the invention. In FIG. 6, the components and parts identical to those in FIG. 5 are denoted by the same reference numerals. The hydrogen production system 20 (will be referred to as "system 20" where necessary) implements the first hydrogen production method to produce hydrogen.

The system 20 has a first tank 11 storing $Li_3N$, a second tank 12 storing water, a third tank 21 storing LiH, a fourth tank 14 storing LiH, separating means 15 for separating $NH_3$, a fifth tank 22 storing the separated $NH_3$, and flow-controlling means 23 for controlling the flow of fluid between the first tank 11 and the fourth tank 14, a tank 16 containing: the first tank 11; the third tank 21; the fourth tank 14; separating means 15; and flow-controlling means 23, and filters 17, 18. The first tank 11 and the second tank 12 are connected to each other via a line 51. The first tank 11, the separating means 15, and the fifth tank 22 are connected to each other via a line 52. The first tank 11 and the fourth tank 14 are connected to each other via a line 53. The third tank 21 and the fifth tank 22 are connected to each other via a line 56. The third tank 21 and the filter 17 are connected to each other via a line 54. The fourth tank 14 and the filter 18 are connected to each other via a line 55. The flow-controlling means 23 is disposed in the line 53. As long as the flow-controlling means 23 is closed, no fluid movement is allowed between the first tank 11 and the fourth tank 14 (e.g., LiOH and water are not allowed to move from the first tank 11 to the fourth tank 14).

When the hydrogen production system 20 produces hydrogen, water is supplied from the second tank 12 to the first tank 11 via the line 51, so that the reaction represented by the reaction formula (1) occurs between the supplied water and the $Li_3N$ stored in the first tank 11 (the first process S11), whereby LiOH and $NH_3$ are produced. The $NH_3$ produced in the first tank 11 is separated by the separating means 15 located at a position higher than the first tank 11 in the direction of gravity and made of activated carbon, or the like. The $NH_3$ separated by the separating means 15 is delivered to the fifth tank 22 via the line 52 and then to the third tank 21 via the line 56. Because LiH is stored in the third tank 21 to which the $NH_3$ has been delivered, the reaction represented by the reaction formula (2) occurs between the LiH stored in the third tank 13 and the $NH_3$ delivered thereto (the second process S12), whereby $LiNH_2$ and $H_2$ are produced. The $H_2$ produced in the third tank 21 is delivered to the filter 17 via the line 54, whereby impurities are removed. On the other hand, the $LiNH_2$ produced in the third tank 21 is kept in the third tank 21. For example, it is reformed into LiH using the lithium hydride production method described above.

Meanwhile, heat is generated as $LiNH_2$ and $H_2$ are produced through the reaction represented by the reaction formula (2) in the third tank 21. Due to this heat, the temperature in the tank 16 increases up to approx. 80 to 120° C. Because the melting point of the flow-controlling means 23, which is made of, for example, polyethylene, is approx. 70 to 100° C., holes (openings) are formed at the flow-controlling means 23 as the reaction represented by the reaction formula (2) progresses. Because the fourth tank 14 is located at a position lower than the first tank 11 in the direction of gravity, as the openings are formed at the flow-controlling means 23 due to the reaction represented by the reaction formula (2), the LiOH or the LiOH and water present in the first tank 11 move to the fourth tank 14 via the openings at the flow-controlling means 23 provided in the line 53. Because LiH is stored in the fourth tank 14 to which the LiOH thus moves, the reaction represented by the reaction formula (3) occurs between the LiH stored in the fourth tank 14 and the LiOH moving thereto (the third process S13), whereby. $Li_2O$ and $H_2$ are produced. The $H_2$ produced in the fourth tank 14 is delivered to the filter 18 via the line 55, whereby impurities are removed. On the other hand, the $Li_2O$ produced in the fourth tank 14 is kept in the fourth tank 14. For example, it is reformed into $Li_3N$ using the lithium nitride production method described above.

As such, as the system 20 implements the first hydrogen production method such that the second process S12 is performed after the first process S11 and the third process S13 is performed after the second process S12, hydrogen is produced in the second process S12 and the third process S13.

In the systems 10 and 20, the delivery of LiOH from the first tank 11 to the fourth tank 14 may either be such that only solid LiOH is delivered from the first tank 11 to the fourth tank 14 or such that LiOH and water are delivered from the first tank 11 to the fourth tank 14. In a case where only solid LiOH is delivered, the solid LiOH and solid LiH react with each other, and therefore the reaction rate tends to be low. More specifically, when solid LiOH and solid LiH react with each other, the reaction rate of LiOH is 0.02 to 0.03 (g/sec/1 $kgH_2$), and the usage rate of $Li_3N$ used when producing hydrogen through the reactions represented by the reaction formulas (1) to (3) is approx. 23%. Therefore, in a case where hydrogen is produced by reacting solid LiOH with solid LiH, in order to improve the usage rate of $Li_3N$, solid LiOH and solid LiH are preferably milled into particles measuring several tens nm or so in size before reacted with each other. Using such LiOH particles and LiH particles for the reaction in the third process S13 increases the contact area between the LiOH and the LiH as compared to when LiOH and LiH are not milled into particles in advance, and therefore the usage rate of $Li_3N$ increases up to approx. 65%. On the other hand, when the reaction represented by the reaction formula (3) is performed by supplying the LiOH and water in the first tank 11 to the fourth tank 14, the reaction rate LiOH is 0.1 to 0.3 (g/sec/1 kgH2), and the usage rate of $Li_3N$ is approx. 50 to 60%. In view of improving the reaction rate of the reaction represented by the reaction formula (3) and the usage rage of $Li_3N$, the third process S13 is preferably performed by supplying the LiOH and water in the first tank 11 to the fourth tank 14.

Further, while LiH is stored in the third tank 13 of the system 10 and in the third tank 21 of the system 20, it is sufficient that at least LiH is stored in the third tank 13, 21, that is, whether other materials should be stored in the third tank 13 and the third tank 21 is not specified. However, $TiCl_3$ is preferably stored in the third tank 13, 21 because it increases the reaction rate of the reaction represented by the reaction formula (2) and thus the yield of the hydrogen produced through said reaction. In a case where LiH and $TiCl_3$ are stored in the third tank 13, 21, the amount of $TiCl_3$ is not necessarily limited. For example, it is set to LiH:$TiCl_3$=1:0.05 in molar ratio.

Further, while LiH is stored in the fourth tank 14 of the system 10 and the fourth tank 14 of the system 20, it is sufficient that at least LiH is stored in the fourth tank 14, and therefore, whether other materials should be stored in the fourth tank 14 is not specified. However, $TiCl_3$ is preferably stored in the fourth tank 14 in addition to LiH because it increases the reaction rate of the reaction represented by the reaction formula (3) and thus the yield of the hydrogen produced through said reaction and it also reduces the temperature required to ensure smooth progression of said reaction. In a case where LiH and $TiCl_3$ are stored in the fourth tank 14, the amount of $TiCl_3$ is not necessarily limited. For example, it is set to LiH:$TiCl_3$=1:0.05 in molar ratio.

A hydrogen production system 30 according to the fifth example embodiment of the invention implements the second hydrogen production method to produce hydrogen. The basic structure of the system 30 is the same as that of the system 10 described above, and therefore the reference numerals for the respective components and parts of the system 30 are indicated in parentheses in FIG. 5. Hereinafter, the system 30 will be described with reference to FIG. 5.

The system 30 has a first tank 31 storing $Mg_3N_2$, a second tank 32 storing water, a third tank 33 storing $MgH_2$, a fourth tank 34 storing $MgH_2$, separating means 35 for separating $NH_3$, a tank 36 containing: the first tank 31; the fourth tank 34; and separating means 35, and filters 37, 38. The first tank 31 and the second tank 32 are connected to each other via a line 51. The first tank 31, the separating means 35, and the third tank 33 are connected to each other via a line 52. The first tank 31 and the fourth tank 34 are connected to each other via a line 53. The third tank 33 and the filter 37 are connected to each other via a line 54. The fourth tank 34 and the filter 38 are connected to each other via a line 55.

When the system 30 produces hydrogen, water is supplied from the second tank 32 to the first tank 31 via the line 51, so that the reaction represented by the reaction formula (4) occurs between the supplied water and the $Mg_3N_2$ stored in the first tank 31 (the first reaction process S21), whereby $Mg(OH)_2$ and $NH_3$ are produced. The $NH_3$ produced in the first tank 31 is separated by the separating means 35 located at a position higher than the first tank 31 in the direction of gravity and made of activated carbon, or the like. The $NH_3$ separated by the separating means 35 is delivered to the third tank 33 via the line 52. Because $MgH_2$ is stored in the third tank 33 to which the $NH_3$ has been delivered, the reaction represented by the reaction formula (5) occurs between the $MgH_2$ stored in the third tank 13 and the $NH_3$ delivered thereto (the second reaction process S22), whereby $Mg(NH_2)_2$ and $H_2$ are produced. The $H_2$ produced in the third tank 33 is delivered to the filter 37 via the line 54, whereby impurities are removed. On the other hand, the $Mg(NH_2)_2$ produced in the third tank 33 is kept in the third tank 33 and, for example, it is reformed into $MgH_2$ using the magnesium hydride production method described above.

Meanwhile, the $Mg(OH)_2$ produced in the first tank 31 is delivered separately, or together with the water supplied to the first tank 31, to the fourth tank 34 via the line 53. The fourth tank 34 is located at a position lower than the first tank 31 in the direction of gravity. Because $MgH_2$ is stored in the fourth tank 34 to which the $Mg(OH)_2$ has been delivered, the reaction represented by the reaction formula (6) occurs between the $MgH_2$ stored in the fourth tank 34 and the $Mg(OH)_2$ delivered thereto (the third reaction process S23), whereby MgO and $H_2$ are produced. The $H_2$ produced in the fourth tank 34 is delivered to the filter 38 via the line 55, whereby impurities are removed. On the other hand, the MgO produced in the fourth tank 34 is kept in the fourth tank 34. For example, it is reformed into $Mg_3N_2$ using the magnesium nitride production method described above.

As such, as the system 30 implements the second hydrogen production method, hydrogen is produced through the first reaction process S21 to the third reaction process S23.

A hydrogen production system 40 according to the sixth example embodiment of the invention implements the second hydrogen production method to produce hydrogen. The basic structure of the system 40 of the sixth example embodiment is the same as that of the system 20 described above, and therefore the reference numerals for the respective components and parts of the system 40 are indicated in parentheses in FIG. 6. Hereinafter, the system 40 will be described with reference to FIG. 6.

The system 40 has a first tank 31 storing $Mg_3N_2$, a second tank 32 storing water, a third tank 41 storing $MgH_2$, a fourth tank 34 storing $MgH_2$, separating means 35 for separating $NH_3$, a fifth tank 42 storing the separated $NH_3$, and flow-controlling means 43 for controlling the flow of fluid between the first tank 31 and the fourth tank 34, a tank 36 containing: the first tank 31; the third tank 41; the fourth tank 34; separating means 35; and flow-controlling means 43, and filters 37, 38. The first tank 31 and the second tank 32 are connected to each other via a line 51. The first tank 31, the separating means 35, and the fifth tank 42 are connected to each other via a line 52. The first tank 31 and the fourth tank 34 are connected to each other via a line 53. The third tank 41 and the fifth tank 42 are connected to each other via a line 56. The third tank 41 and the filter 37 are connected to each other via a line 54. The fourth tank 34 and the filter 38 are connected to each other a line 55. The flow-controlling means 43 is disposed in the line 53. As long as the flow-controlling means 43 is closed, no fluid movement is allowed between the first tank 31 and the fourth tank 34 (e.g., $Mg(OH)_2$ and water are not allowed to move from the first tank 31 to the fourth tank 34).

When the hydrogen production system 40 produces hydrogen, water is supplied from the second tank 32 to the first tank 31 via the line 51, so that the reaction represented by the reaction formula (4) occurs between the supplied water and the $Mg_3N_2$ stored in the first tank 31 (the first reaction process S21), whereby $Mg(OH)_2$ and $NH_3$ are produced. The $NH_3$ produced in the first tank 31 is separated by the separating means 35 located at a position higher than the first tank 31 in the direction of gravity and made of activated carbon, or the like. The $NH_3$ separated by the separating means 35 is delivered to the fifth tank 42 via the line 52 and then to the third tank 41 via the line 56. Because $MgH_2$ is stored in the third tank 41 to which the $NH_3$ has been delivered, the reaction represented by the reaction formula (5) occurs between the $MgH_2$ stored in the third tank 41 and the $NH_3$ delivered thereto (the second reaction process S22), whereby $Mg(NH_2)_2$ and $H_2$ are produced. The $H_2$ produced in the third tank 41 is delivered to the filter 37 via the line 54, whereby impurities are removed. On the other hand, the $Mg(NH_2)_2$ produced in the third tank 41 is kept in the third tank 41. For example, it is reformed into $MgH_2$ using the magnesium hydride production method described above.

Meanwhile, heat is generated as $Mg(NH_2)_2$ and $H_2$ are produced through the reaction represented by the reaction formula (5) in the third tank 41. Due to this heat, the temperature in the tank 36 increases up to approx. 100 to 140° C. Because the melting point of the flow-controlling means 43, which is made of, for example, polyethylene, is approx. 70 to 100° C., holes (openings) are formed at the flow-controlling means 43 as the reaction represented by the reaction formula (5) progresses. Because the fourth tank 34 is located at a position lower than the first tank 31 in the direction of gravity, as the openings are formed at the flow-controlling means 43 due to the reaction represented by the reaction formula (5), the $Mg(OH)_2$ and water present in the first tank 31 move to the fourth tank 34 via the openings at the flow-controlling means 43 provided in the line 53. Because $MgH_2$ is stored in the fourth tank 34 to which the $Mg(OH)_2$ thus moves to, the reaction represented by the reaction formula (6) occurs between the $MgH_2$ stored in the fourth tank 34 and the $Mg(OH)_2$ moving thereto (the third reaction process S23), whereby MgO and $H_2$ are produced. The $H_2$ produced in the fourth tank 34 is delivered to the filter 38 via the line 55, whereby impurities are removed. On the other hand, the MgO produced in the fourth tank 34 is kept in the fourth tank 34. For example, it is reformed into $Mg_3N_2$ using the magnesium nitride production method described above.

As such, as the system 40 implements the second hydrogen production method such that the second reaction process S22 is performed after the first reaction process S21 and the third reaction process S23 is performed after the second reaction process S22, hydrogen is produced in the second reaction process S22 and the third reaction process S23.

While the $Mg(OH)_2$ and water in the first tank 31 are delivered to the fourth tank 34 to perform the third reaction process S23 in the systems 30, 40 described above, the invention is not limited to this feature. For example, the third reaction process S23 may be performed by delivering only the solid $Mg(OH)_2$ remaining in the first tank 31 to the fourth tank 34. In this case, however, because solid $Mg(OH)_2$ and solid $MgH_2$ react with each other, the reaction rate tends to be low. More specifically, when solid $Mg(OH)_2$ and solid $MgH_2$ react with each other, the reaction rate of $Mg(OH)_2$ is 0.01 to 0.03 (g/sec/1 kg$H_2$), and the usage rate of $Mg_3N_2$ for the reactions represented by the reaction formulas (4) to (6) is approx. 15 to 20%. Therefore, in a case where hydrogen is produced by reacting solid $Mg(OH)_2$ with solid $MgH_2$, in order to improve the usage rate of $Mg_3N$, solid $MgH_2$ and solid $Mg(OH)_2$ are preferably milled into particles measuring several tens nm or so in size before reacted with each other.

Using such $MgH_2$ particles and $Mg(OH)_2$ particles for the reaction in the third reaction process S23 increases the contact area between $MgH_2$ and $Mg(OH)_2$ as compared to when $MgH_2$ and solid $Mg(OH)_2$ are not milled into particles in advance, and therefore the usage rate of $Mg_3N_2$ increases up to approx. 30 to 35%. On the other hand, when the third reaction process S23 is performed by supplying the $Mg(OH)_2$ and water in the first tank 31 to the fourth tank 34, the reaction rate of $Mg(OH)_2$ is 0.07 to 0.1 (g/sec/1 kg$H_2$), and the usage rate of $Mg_3N_2$ is approx. 40 to 55%. Thus, in view of improving the reaction rate of the reaction represented by the reaction formula (6) and the usage rage of $Mg_3N_2$, the reaction represented by the reaction formula (6) is preferably caused by supplying the $Mg(OH)_2$ and water in the first tank 31 to the fourth tank 34.

Further, while $MgH_2$ is stored in the third tank 33 of the system 30 and in the third tank 41 of the system 40, it is sufficient that at least $MgH_2$ is stored in the third tank 33, 41, that is, whether other materials should be stored in the third tank 33, 41 is not specified. However, $TiCl_3$ is preferably stored in the third tank 33, 41 in addition to $MgH_2$ because it increases the reaction rate of the reaction represented by the reaction formula (5) and thus increases the yield of the hydrogen produced through said reaction. In a case where $MgH_2$ and $TiCl_3$ are stored in the third tank 33, 41, the amount of $TiCl_3$ is not necessarily limited. For example, it is set to $MgH_2:TiCl_3=1:0.05$ in molar ratio.

Further, while $MgH_2$ is stored in the fourth tank 34 of the system 30 and the fourth tank 34 of system 40, it is sufficient that at least $MgH_2$ is stored in the fourth tank 34, and therefore whether other materials should be stored in the fourth tank 34 is not specified. However, $TiCl_3$ is preferably stored in the fourth tank 34 in addition to $MgH_2$ because it increases the reaction rate of the reaction represented by the reaction formula (6) and thus increases the yield of the hydrogen produced through said reaction and it also reduces the temperature required to ensure smooth progression of said reaction. In a case where $MgH_2$ and $TiCl_3$ are stored in the fourth tank 34, the amount of $TiCl_3$ is not necessarily limited. For example, it is set to $MgH_2:TiCl_3=1:0.05$ in molar ratio.

In the hydrogen production systems of the invention, the supplying of water to the first tank to perform the first process or the first reaction process may be performed in various manners. However, if a large amount of water is supplied to the first tank, it causes a rapid temperature increase and thus increases the pressure of ammonia, which may result in production of a mixture gas of ammonia and water vapors. In view of preventing this, preferably, water is gradually supplied to the first tank at a low rate or cooled water is supplied to the first tank.

Figure 7:
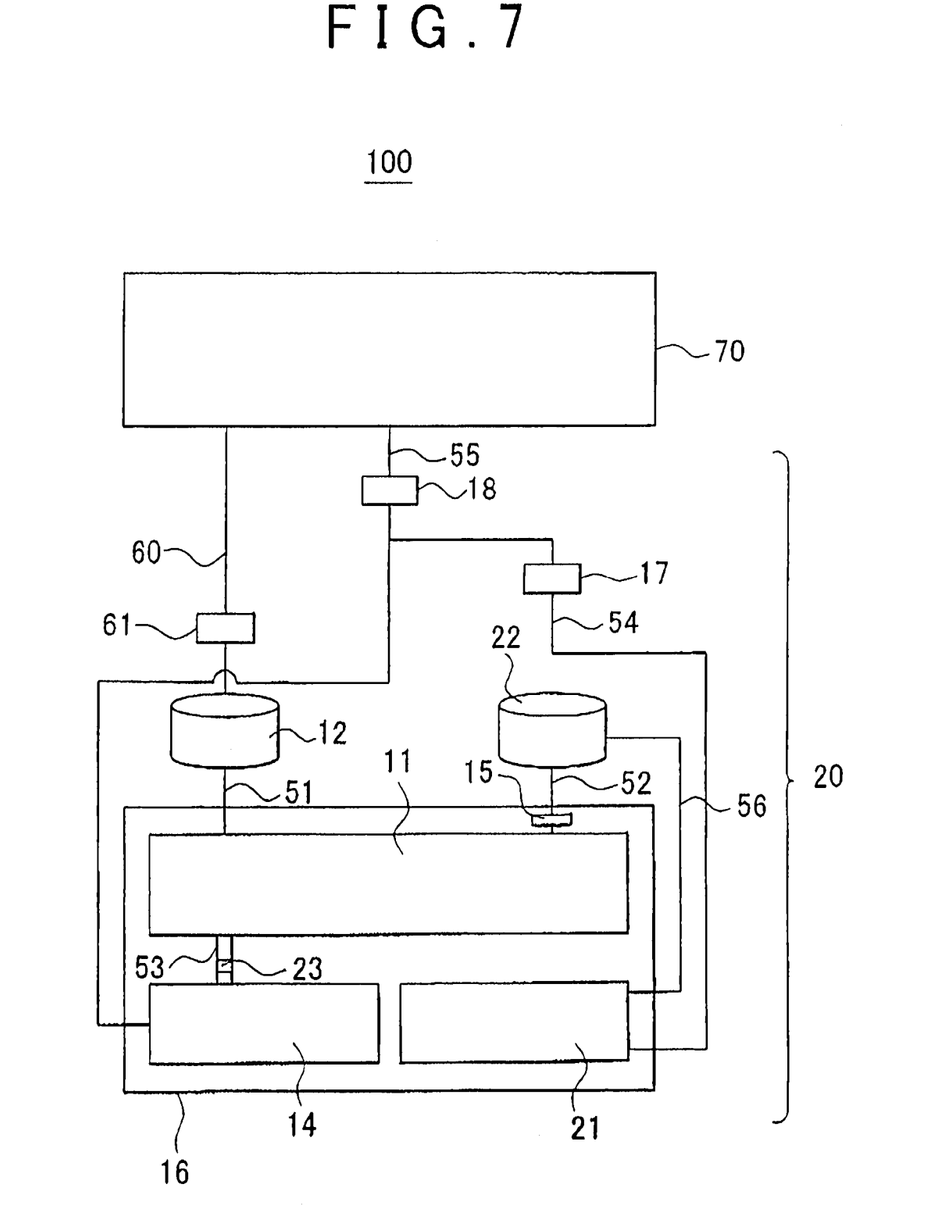
FIG. 7 is a view schematically showing a fuel cell system according to the seventh example embodiment of the invention.

FIG. 7 schematically shows a fuel cell system 100 according to the seventh example embodiment of the invention. In FIG. 7, the components and parts identical to those shown in FIG. 6 are denoted by the same reference numerals and therefore they are not described again. The fuel cell system 100 will hereinafter be described with reference to FIG. 7.

The fuel cell system 100 has a fuel cell module 70 constituted of a plurality of fuel cells (not shown in the drawings) and a hydrogen production system 20. The fuel cell module 70 and the hydrogen production system 20 are connected to each other via a line 55 and a line 60. The hydrogen produced by the hydrogen production system 20 is delivered to the fuel cell module 70 via the line 55 and then to the anodes of the respective fuel cells of the fuel cell module 70. Water is produced as the fuel cell module 70 generates electric power from the hydrogen supplied to the anodes of the respective fuel cells and the air supplied to the cathodes of the respective fuel cells. The water is filleted by a filter 61 provided in the line 60 to remove the impurities contained therein and then delivered to the second tank 12. After delivered to the second tank 12, the water is then delivered to the first tank 11 via the line 51 and used to produce hydrogen. According to the fuel cell system 100, as such, the hydrogen produced by the hydrogen production system 20 is supplied to the fuel cell module 70, and the fuel cell module 70 operates using the supplied hydrogen, and the water produced through the operation of the fuel cell module 70 is then supplied to the second tank 12 to produce hydrogen. According to the fuel cell system 100, thus, hydrogen production materials can be reused.

While the fuel cell system 100 has the hydrogen production system 20, it may alternatively have other hydrogen production system, such as the hydrogen production system 10, 30, or 40. However, because the reactions represented by the reaction formulas (3) and (6) are rate-determining reactions and their reactions rates increase at a high temperature, if the third process S13 and the third reaction process S23 are performed after the second process S12 and the second reaction process S22, respectively, the time needed for hydrogen production through the reaction represented by the reaction formula (3) and the time needed for hydrogen production through the reaction represented by the reaction formula (6) become shorter, and therefore the hydrogen production efficiency improves accordingly. For this reason, the hydrogen production system 20 or the hydrogen production system 40 is preferably incorporated in the fuel cell system 100.

Further, the masses of lithium nitride, water, and so on, provided in the hydrogen production system 20 of the fuel cell system 100 are not necessarily limited. For example, when it is necessary to produce 5 kg of hydrogen using the hydrogen production system 20, it is considered that at least 625 mol of lithium nitride, 2500 mol of lithium hydride, and 1875 mol of water are needed. Further, approx. 20 to 40 kg of water is needed to facilitate the reaction represented by the reaction formula (3) to achieve a higher hydrogen production rate. This water is available from the water produced at the fuel cell module 70, and therefore the hydrogen production system 20 is only required to have 625 mol of lithium nitride, 2500 mol of lithium hydride, and 1875 mol of water.

Further, the dimensions of the hydrogen production system 20 of the fuel cell system 100 (i.e., the dimensions of the tank 16) are not necessarily limited. For example, in a case where 5 kg of hydrogen is produced using the hydrogen production system 20, a tank having a capacity of approx. 170 L and a weight of approx. 160 kg may be used as the tank 16.

A research was conducted on the influence of $TiCl_3$ on hydrogen producing reactions (the reaction rate, the yield of hydrogen, and the reaction temperature). This research was conducted by producing hydrogen using the system 20 having the third tank 21 and the fourth tank 14 both containing LiH but not containing $TiCl_3$ and using a hydrogen production system 20' (will hereinafter be referred to as "system 20'") having a third tank and a fourth tank corresponding to the third tank 21 and the third tank 13 and containing LiH and $TiCl_3$. Note that other structures of the system 20' are identical to those of the system 20.

During preparation for the research, LiH was stored in the third tank 21 and the fourth tank 14 as follows. First, LiH was weighed using a glove box containing an argon atmosphere (dew point: −85° C., oxygen concentration: 1 ppm or lower), and the LiH was put in a milling container. Then, the milling container was vacuumed, and then a hydrogen atmosphere (1 MPa) was formed in the milling container. Then, ball milling was performed at a room temperature for 10 hours. Then, the milling container was moved into the glove box containing an argon atmosphere, and the milled LiH was put in the third tank 21 and the fourth tank 14 in the globe box.

On the other hand, LiH and $TiCl_3$ were put in the third tank and the fourth tank of the system 20' as follows. The third tank and the fourth tank of the system 20' will hereinafter be referred to as "the third tank 21'" and "the fourth tank 14'", respectively. First, LiH and $TiCl_3$ were weighed to a molar ratio of $LiH:TiCl_3=1:0.05$ using a glove box containing an argon atmosphere (dew point: −85° C., oxygen concentration: 1 ppm or lower), and the LiH and $TiCl_3$ were put in a milling container. Then, the milling container was vacuumed, and then a hydrogen atmosphere (1 MPa) was formed in the milling container. Then, ball milling was performed at a room temperature for 10 hours. Then, the milling container was moved into the glove box containing an argon atmosphere, and the milled LiH $TiCl_3$ were put in the third tank 21' and the fourth tank 14' in the globe box.

The rate (reaction rate) of hydrogen production by the reaction represented by the reaction formula (2) at 20° C. in the system 20 was 0.1 to 0.3 [g/sec]. On the other hand, the rate (reaction rate) of hydrogen production by the reaction represented by the reaction formula (2) at 20° C. in the system 20' was 0.5 to 1 [g/sec]. The rate (reaction rate) of hydrogen production by the reaction represented by the reaction formula (3) at 200° C. in the system 20 was 0.02 to 0.03 [g/sec]. On the other hand, the rate (reaction rate) of hydrogen production by the reaction represented by the reaction formula (3) at 200° C. in the system 20' was 0.05 to 0.1 [g/sec].

The yield of hydrogen produced by the reaction represented by the reaction formula (2) at 25° C. in the system 20 was approx. 65 to 75%. On the other hand, the yield of hydrogen produced by the reaction represented by the reaction formula (2) at 25° C. in the system 20' was 80 to 85%. The yield of hydrogen produced by the reaction represented by the reaction formula (3) at 250° C. in the system 20 was approx. 65 to 75%. On the other hand, the yield of hydrogen produced by the reaction represented by the reaction formula (3) at 180° C. in the system 20' was 80 to 85%.

In the case of the system 20, a target hydrogen production rate X for hydrogen production by the reaction represented by the reaction formula (3) was achieved in a thermal condition of around 250° C. On the other hand, in the case of the system 20', the target hydrogen production rate X for hydrogen production by the reaction represented by the reaction formula (3) was achieved in a thermal condition of around 180° C.

The "after the first process" in the present invention may be meant as "after the ammonia to be reacted in the second process has been produced in the first process", or "after the hydroxide of the metal to be reacted in the third process has been produced in the first process". In the hydrogen production systems of the invention, the second process and the third process may be performed after the end of the first process, or the second process and/or the third process may be performed during the first process.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A hydrogen production method comprising:
a first process in which nitrogen compounds of metal and water are reacted to produce ammonia and hydroxide of the metal;
a second process in which hydrogen compounds of a metal and the ammonia produced in the first process are reacted; and
a third process in which hydrogen compounds of a metal and the hydroxide of the metal produced in the first process are reacted.

2. The hydrogen production method according to claim 1, wherein
the reaction between the hydrogen compounds of the metal and the ammonia in the second process is performed in the presence of $TiCl_3$.

3. The hydrogen production method according to claim 1, wherein
the reaction between the hydrogen compounds of the metal and the hydroxide of the metal in the third process is performed in the presence of $TiCl_3$.

4. The hydrogen production method according to claim 1, wherein
the hydrogen compounds of the metal are produced through reaction between amide compounds of the metal produced in the second process and hydrogen.

5. The hydrogen production method according to claim 1, wherein
the hydrogen compounds of the metal are hydrogen compounds of lithium or hydrogen compounds of magnesium.

6. The hydrogen production method according to claim 1, wherein
the nitrogen compounds of the metal are produced through reaction between the metal obtained from oxide of the metal produced in the third process and nitrogen.

7. The hydrogen production method according to claim 6, wherein
the metal reacted with the nitrogen is obtained by reducing the oxide of the metal through molten-salt electrolysis.

8. The hydrogen production method according to claim 1, wherein
the nitrogen compounds of the metal are nitrogen compounds of lithium or nitrogen compounds of magnesium.

9. A hydrogen production system that implements the hydrogen production method according to claim 1, comprising:
a first tank storing the nitrogen compounds of the metal;
a second tank storing the water; and
a third tank and a fourth tank each storing the hydrogen compounds of the metal;
separating means for separating the ammonia produced in the first process,
wherein
the system is configured to deliver, by the first process, the water in the second tank to the first tank,
the system is configured to deliver, by the second process after the first process, the ammonia separated by the separating means to the third tank, and
the system is configured to deliver, by the third process after the first process, the hydroxide of the metal in the first tank to the fourth tank.

10. A hydrogen production system that implements the hydrogen production method according to claim 1, comprising:
a first tank storing the nitrogen compounds of the metal;
a second tank storing the water; and
a third tank and a fourth tank each storing the hydrogen compounds of the metal;
separating means for separating the ammonia produced in the first process;
a fifth tank storing the ammonia separated by the separating means; and
flow-controlling means for controlling movement of fluid between the first tank and the fourth tank,
wherein
the system is configured to deliver, by the first process, the water in the second tank to the first tank,
the system is configured to deliver, by the second process after the first process, the ammonia from the fifth tank to the third tank, so that an opening is formed at the flow-controlling means due to heat generated by the second process, and
the system is configured to deliver, by the third process after the first process, the hydroxide of the metal and the water in the first tank to the fourth tank through the opening.

11. The hydrogen production system according to claim 9, wherein
the metal is lithium or magnesium.

12. The hydrogen production system according to claim 9, further comprising

TiCl$_3$ stored in the third tank.

13. The hydrogen production system according to claim 9, further comprising

TiCl$_3$ stored in the fourth tank.

14. A fuel cell system comprising:

a fuel cell; and the hydrogen production system according to claim 9, wherein the fuel cell system is configured such that hydrogen produced by the hydrogen production system is delivered to the fuel cell, and water produced at the fuel cell is delivered to the second tank.

15. The hydrogen production system according to claim 10, wherein the metal is lithium or magnesium.

16. The hydrogen production system according to claim 10, further comprising TiCl$_3$ stored in the third tank.

17. The hydrogen production system according to claim 10, further comprising TiCl$_3$ stored in the fourth tank.

18. A fuel cell system comprising:

a fuel cell; and the hydrogen production system according to claim 10, wherein the fuel cell system is configured such that hydrogen produced by the hydrogen production system is delivered to the fuel cell, and water produced at the fuel cell is delivered to the second tank.

* * * * *